US008854383B2

(12) United States Patent
Tsai et al.

(10) Patent No.: US 8,854,383 B2
(45) Date of Patent: Oct. 7, 2014

(54) PIXEL VALUE COMPACTION FOR GRAPHICS PROCESSING

(75) Inventors: Ming-Chang Tsai, San Diego, CA (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 13/085,855

(22) Filed: Apr. 13, 2011

(65) Prior Publication Data

US 2012/0262493 A1 Oct. 18, 2012

(51) Int. Cl.
*G06T 1/20* (2006.01)
*G06F 15/00* (2006.01)
*G06T 1/00* (2006.01)
*G06T 15/00* (2011.01)

(52) U.S. Cl.
CPC ....... *G06T 15/005* (2013.01); *G06F 2213/0038* (2013.01); *G06T 1/20* (2013.01)
USPC .......................................... 345/506; 345/501

(58) Field of Classification Search
USPC .......................................... 345/501–506, 522
See application file for complete search history.

(56) References Cited

U.S. PATENT DOCUMENTS

| 6,181,353 | B1 * | 1/2001 | Kurisu | 345/537 |
| 2004/0257374 | A1 * | 12/2004 | McGowan | 345/547 |
| 2008/0049028 | A1 * | 2/2008 | Hancock et al. | 345/502 |
| 2009/0113303 | A1 * | 4/2009 | Goossen et al. | 715/719 |
| 2009/0284538 | A1 * | 11/2009 | Lin et al. | 345/552 |
| 2009/0290018 | A1 * | 11/2009 | Abe | 348/76 |
| 2009/0324087 | A1 * | 12/2009 | Kletter | 382/195 |
| 2010/0021065 | A1 | 1/2010 | Sibiryakov | |

FOREIGN PATENT DOCUMENTS

| EP | 1816575 A1 | 8/2007 |
| JP | 63010289 A2 | 1/1988 |
| WO | 2004109595 A2 | 12/2004 |

OTHER PUBLICATIONS

Lowe, "Distinctive Image Features from Scale-Invariant Keypoints," International Journal of Computer Vision, Jan. 5, 2004, 28 pp.
Lauterback et al., "Work distribution methods on GPUs," Department of Computer Science, University of North Carolina, retrieved Feb. 10, 2011, from http://gamma.cs.unc.edu/gpucol/GPU-Workqueues.pdf, 6 pp.
International Search Report and Written Opinion—PCT/US2012/033650—ISA/EPO—Nov. 15, 2012.
Roger et al., "Efficient Stream Reduction on the GPU", Workshop on General Purpose Processing on Graphics Processing Units, Oct. 2007, XP002686259, Retrieved from the Internet: URL:http://maverick.inria.fr/Publications/ 2007/RAH07a/gpuReduction.pdf [retrieved on Oct. 31, 2012 p. 1, paragraph 1.

(Continued)

*Primary Examiner* — Kimbinh T Nguyen
*Assistant Examiner* — Raffi Isanians
(74) *Attorney, Agent, or Firm* — James R. Cambale, Jr.

(57) ABSTRACT

In general, aspects of this disclosure describe example techniques for efficient usage of the fixed data rate processing of a graphics processing unit (GPU) for a variable data rate processing. For example, the GPU may be coupled to a pixel value processing unit that receives pixel values for pixels in an image processed by the GPU. The pixel value processing unit may determine whether the pixel values are for pixels that require further processing, and store the pixel values for the pixels that are required for further processing in a buffer.

30 Claims, 7 Drawing Sheets

(56) References Cited

OTHER PUBLICATIONS

Ziegler G., et al., "On-the-fly Point Clouds through Histogram Pyramids", 11th International Fall Workshop on Vision, Modeling and Visualization 2006 (VMV2006), Nov. 2006, XP002686260, Retrieved from the Internet: URL:http://www.mpi-inf.mpg.de/gziegler/gpu_pointlist/paper17_gpu_pointclouds.pdf [retrieved on Oct. 31, 2012] abstract.

* cited by examiner

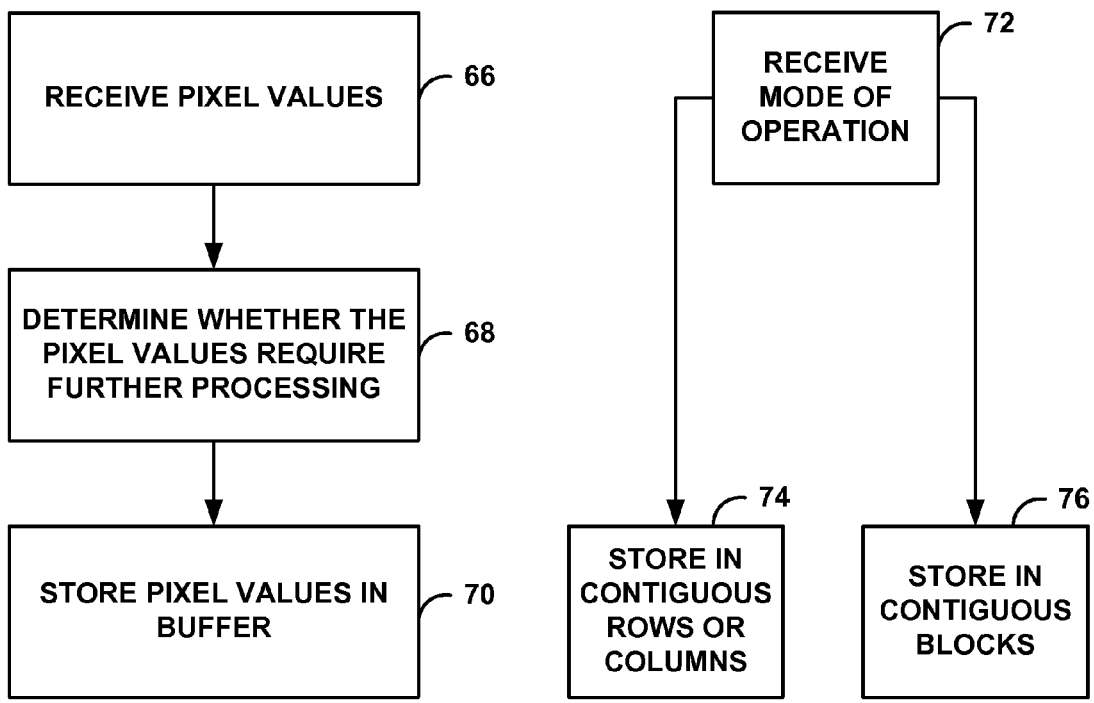
FIG. 6
FIG. 7
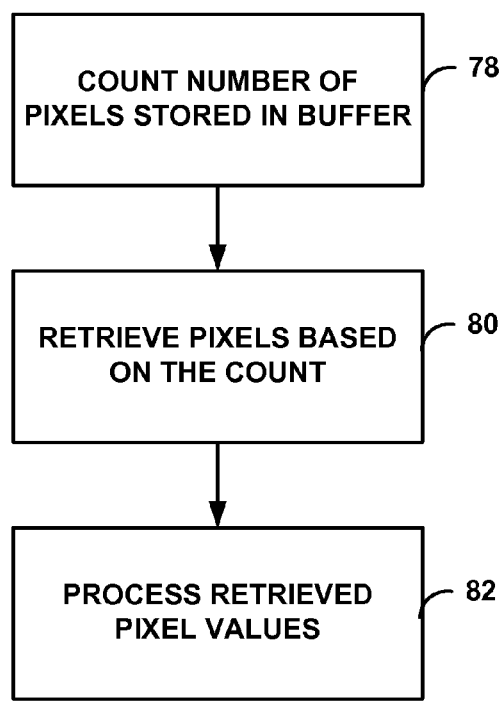
FIG. 8

PIXEL VALUE COMPACTION FOR GRAPHICS PROCESSING

TECHNICAL FIELD

This disclosure relates to efficient storage of pixel values and, more particularly, to efficient storage of pixel values for processing in a graphic processing unit (GPU).

BACKGROUND

A graphics processing unit (GPU) provides pixel processing for graphics applications. In some examples, a GPU may be configured to support parallel processing operations. A GPU may generate a rectangular grid of pixels for display on a screen. The GPU may perform functions such as shading, culling, blending, illuminating, and others to generate pixel values for the pixels to be displayed on the screen. Parallel processing by the GPU may promote efficient processing for quick rendering of pixels to be displayed.

SUMMARY

This disclosure describes techniques for compacting data for efficient processing and efficient storage in a buffer used by a GPU. The buffer may be a frame buffer or a display buffer, as two examples. A graphics processing unit (GPU) may generate an output stream of pixel values for output to buffer to drive a screen or support one or more image-based computing applications. The output stream may include pixel values for pixels that may be needed for subsequent processing by the GPU, as well as pixel values for pixels that may not be needed for subsequent processing by the GPU.

In some examples, a pixel value processing unit may receive the output stream from the GPU. The pixel value processing unit may be configured to efficiently store the pixels values for pixels that may be needed for subsequent processing in a buffer. The pixel value processing unit may be configured to not store the pixel values for pixels that are not needed for subsequent processing in the buffer.

As described in more detail, the pixel value processing unit may allow a GPU configured for fixed data rate processing to efficiently utilize its fixed data rate processing for variable data rate processing. However, aspects of this disclosure should not be considered limited to only fixed data rate processing GPUs.

In one example, this disclosure describes a method comprising receiving, with a pixel value processing unit coupled to a graphics processing unit (GPU) and external to the GPU, an output stream from the GPU that includes pixel values for one or more pixels in an image processed by the GPU. The method also comprises determining, with the pixel value processing unit, whether the pixel values in the output stream are for pixels that require further processing by the GPU. The method further comprises storing, in a buffer that is external to the pixel value processing unit and coupled to the pixel value processing unit, the pixel values for the pixels that require further processing by the GPU.

In another example, this disclosure describes an apparatus comprising a graphics processing unit (GPU) configured to process an image to generate an output stream that includes pixel values for one or more pixels within the processed image, and buffer. The apparatus also includes a pixel value processing unit that is external to the GPU, is coupled to the GPU and the buffer, and configured to determine whether the pixel values in the output stream are for pixels that require further processing by the GPU, and store the pixel values for the pixels that require further processing by the GPU in the buffer.

In another example, this disclosure describes an apparatus comprising a graphics processing unit (GPU), a buffer, and a pixel value processing unit that is external to the GPU and coupled to the GPU and the buffer. The pixel value processing unit comprises means for receiving an output stream from the GPU that includes pixel values for one or more pixels in an image processed by the GPU, means for determining whether the pixel values in the output stream are for pixels that require further processing by the GPU, and means for storing, in the buffer, the pixel values for the pixels that require further processing by the GPU.

In another example, this disclosure describes a non-transitory computer-readable storage medium comprising instructions that cause a pixel value processing unit to receive, with the pixel value processing unit coupled to a graphics processing unit (GPU) and external to the GPU, an output stream from the GPU that includes pixel values for one or more pixels in an image processed by the GPU. The instructions also cause the pixel value processing unit to determine whether the pixel values in the output stream are for pixels that require further processing, and store, in a buffer that is external to the pixel value processing unit and the GPU and coupled to the pixel value processing unit, the pixel values for the pixels that require further processing.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a flow chart illustrating an example operation of a pixel value processing unit.

FIG. 7 is a flow chart illustrating another example operation of a pixel value processing unit.

FIG. 8 is a flow chart illustrating another example operation of a pixel value processing unit.

DETAILED DESCRIPTION

Figure 1:
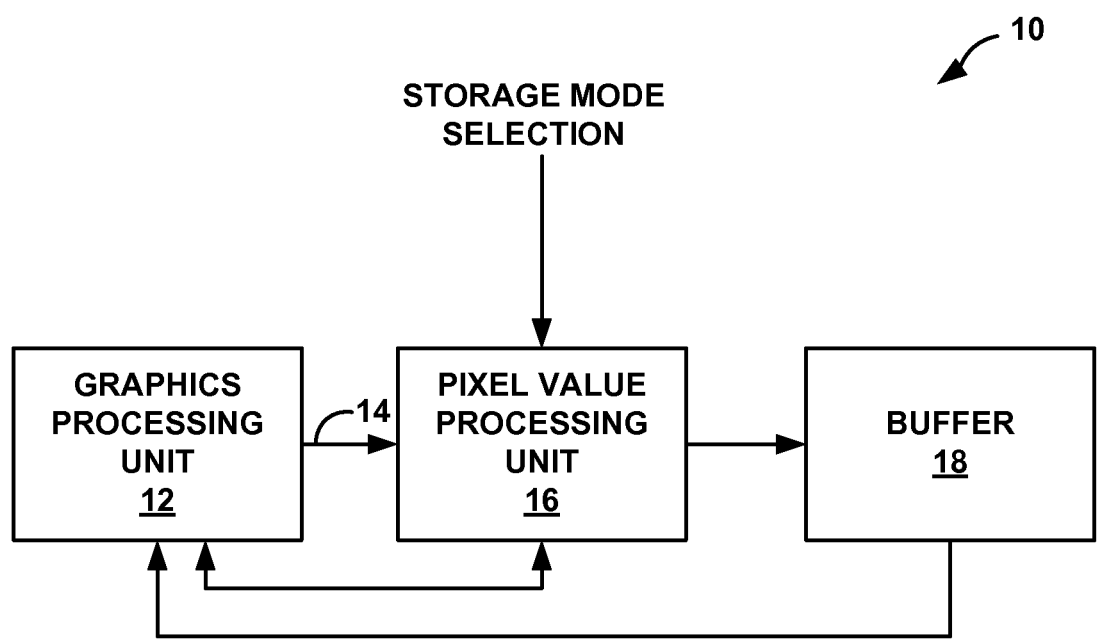
FIG. 1 is a block diagram illustrating a graphics processing unit (GPU) in a pixel value storage system.

Aspects of this disclosure are directed to techniques for streamlining variable data rate processing on a graphics processing unit (GPU) which may be designed primarily for fixed data rate processing. A graphics application produces visual content represented in an image that is a rectangular grid of pixels for display on a screen. The number of pixels to be displayed on the screen may be relatively large, e.g., 640× 480, or 307,200 pixels, in one example.

A GPU may be designed to efficiently process such large numbers of pixels using multiple levels of parallel processing with an assumption that most or all of the pixels are to be processed, and that such pixels require similar, if not identical, operations. As used in this disclosure, the phrase "fixed data rate processing" may generally refer to GPU processing of all or most of the pixels in an image that is to be displayed on a screen. For example, assume that an image encompasses a screen and that the screen includes 640×480 pixels, i.e., 307,200 pixels. In this example, the GPU would need to process pixel values for all 307,200 pixels on the screen that includes 640×480 pixels.

As described in more detail, for some graphics applications, the GPU may not need to process all of the pixels in an image, and may need to only process a select few pixels. As used in this disclosure, the phrase "variable data rate processing" may generally refer to GPU processing that requires processing a select few pixels in an image, instead of all of the pixels. For example, for some graphics applications, the GPU may need to initially process all or most of the pixels in the image. Then, for subsequent processing passes, the GPU may need to process a select few pixels in the image.

The parallel processing functionality of the GPU may be well suited for fixed data rate processing because in most instances the GPU may process all of the pixels in an image. In other words, fixed data rate processing may be considered as instances where the number of pixels that the GPU is to process is generally fixed in each processing pass. Accordingly, the GPU may be designed for fixed data rate processing. However, such fixed data rate processing may not promote efficient processing when a select few of the pixels in an image are to be processed, rather than all of the pixels in the image. For example, assume that for a particular graphics application only 3,072 pixels of the 307,200 pixels need to be processed. In this example, due to the fixed data rate processing, the GPU may process all 307,200 pixels, rather than the select few pixels, e.g., 3,702 pixels.

This disclosure describes a pixel value processing unit that may allow the GPU to efficiently utilize its fixed data rate processing structure and functionality even when only a select few pixels (i.e., a subset of the pixels that is less than all pixels in the image) need to be processed, e.g., to provide variable data rate processing. The pixel value processing unit may be referred to as a pixel value compaction unit. The pixel value compaction unit, e.g., the pixel value processing unit, may be coupled to the GPU, and may receive an output data stream from the GPU. The output data stream from the GPU may include pixel values for pixels that may require further processing, and may include pixel values for pixels that may not require further processing. The pixel values for pixels that may not require further processing may be null values, as one example when the GPU implements a Spatial Invariant Feature Transform (SIFT) as described below.

The pixel compaction unit may determine which pixel values are for pixels that may require further processing, and which pixel values are for pixels that may not require further processing. For example, the pixel value compaction unit may evaluate the color values or coordinate values to determine which pixel values are for pixels that may require further processing, and which pixel values are for pixels that may not require further processing. Based on the determination, the pixel value compaction unit may store pixel values for pixels that may be required for further processing within a buffer such as a frame buffer or display buffer, as two examples, and may not store pixel values for pixels that may not be required for further processing within the frame buffer or display buffer. For example, the pixel value compaction unit may store, in a buffer, pixel values for pixels that require further processing by the GPU, and discard pixels that do not require further processing by the GPU.

The GPU may then retrieve the pixel values for pixels that require further processing rather than all of the pixel values including pixel values for pixels that do not require further processing. In this manner, the GPU may process pixels that require further processing without wasting computational resources on processing pixels that do not require further processing. In other words, because the pixel value compaction unit dynamically reduces the number of pixels the GPU needs to process, the GPU may utilize its fixed data rate processing on pixels values for a select few pixels, rather than pixel values for all of the pixels.

FIG. 1 is a block diagram illustrating a graphics processing unit (GPU) 12 in a pixel value storage system 10. Pixel value storage system 10 may be a part of a device, as illustrated in more detail in FIG. 6. Pixel value storage system 10 may include GPU 12, pixel value processing unit 16, and buffer 18. Pixel value processing unit 16 may be referred to as a pixel value compaction unit. Examples of buffer 18 include, but are not limited to, a frame buffer and a display buffer.

GPU 12 may be configured to render images on a screen. For example, a processor (not shown) may execute a graphics application that generates an image to be displayed on the screen. The image may comprise a plurality of pixels. The processor may divide the image into a plurality of polygons and determine the coordinates for the vertices of the polygons. The processor may also determine various other attributes for the vertices such as luminance values, color values, or other such pixel values for the polygons.

GPU 12 may receive the pixel values for the pixels within the image and process the pixel values to render the image on a screen. Examples of GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may implement a graphics pipeline that uses the pixel values to render the image. The graphics pipeline may be implemented as software executing on GPU 12, firmware executing on GPU 12, one or more hardware units formed on GPU 12, or a combination thereof.

The graphics pipeline may include multiple components. For example, the graphics pipeline, of GPU 12, may include a vertex shader that retrieves the vertex data and transforms the coordinates of the vertices into another coordinate system, and calculates light values for the vertices. The graphics pipeline, of GPU 12, may also include a primitive assembler that determines the depth (z) of pixels within a polygon. The graphics pipeline, of GPU 12, may also include an early depth test engine that removes pixels within the polygons from further processing if those pixels are subsequently occluded by other pixels. The graphics pipeline, of GPU 12, may also include a pixel shader that interpolates color values for pixels within a polygon based on the color values for the vertices of the polygon.

The various components of the graphics pipeline are provided for illustration purposes and should not be considered limiting. In alternate examples, the graphics pipeline may include more components than those described above. The graphics pipeline may also include fewer components than those described above. Examples of GPU 12 are illustrated in further detail in FIG. 2A and FIG. 2B.

GPU 12 may be able to perform the above example functions with its parallel processing. In some instances, all or most of the pixels within an image need to be processed, which may be relatively large number of pixels, and parallel processing may allow GPU 12 to quickly and efficiently process the pixels. Examples where GPU 12 is to process all or most of the pixels in an image may be referred to as "fixed data rate processing" because the number of pixels to be processed within the image may be generally fixed. Because most graphics applications require GPU 12 to process all or most of the pixels in an image, GPU 12 may be designed to implement fixed data rate processing.

However, for some graphics applications, GPU 12 may not need to process all or most of the pixels in an image. For these graphics applications, GPU 12 may need to process a select few pixels in an image. Examples where GPU 12 is to process a select few pixels in an image may be referred to as "variable data rate processing" because the number of pixels to be processed is not fixed, and may vary. Due to the fixed data rate processing nature of GPU 12, GPU 12 may not be as efficient in variable data rate processing. For example, GPU 12, by itself, may process all of the pixels in an image even when a select few pixels in the image should be processed. Accordingly, for a graphics application that does not require processing on all or most of the pixels in the image, and requires processing on a select few pixels, GPU 12, by itself, may not be as efficient in processing pixels for such a graphics application.

For example, if there are D number of pixels, and each pixel requires A number of processing cycles, then the total number of pixel-cycles performed by GPU 12 according to a fixed rate processing scheme may be represented as $A*D$. If approximately 1% of the D number of pixels require further processing, and each of these pixels require B number of processing cycles, then the loss of efficiency of GPU 12 may be represented as $(0.01+1.01*(B/A))$. This loss of efficiency is a comparison of the efficiency of GPU 12 if GPU 12 processed all of the pixels, as compared to the efficiency of GPU 12 if GPU 12 processed only those pixels that require further processing. If the 1% of the D number of pixels are randomly and sparely located within an image, the loss of efficiency of GPU 12 may be further amplified.

Pixel value processing unit 16, which as indicated above may be referred to as pixel value compaction unit, may allow GPU 12 to efficiently utilize its fixed data rate processing even when only a select few pixels need to be processed, e.g., thereby supporting variable data rate processing. Pixel value processing unit 16 may be a fixed function hardware unit. Pixel value processing unit 16 may be coupled to GPU 12 and may receive output stream 14 from GPU 12. Output stream 14 may include pixel values only for pixels that require further processing, or pixel values for both pixels that require further processing and pixels that do not require further processing.

Pixel value processing unit 16 may determine which pixel values within output stream 14 are pixel values for pixels that require further processing, and which pixel values within output stream 14 are pixel values for pixels that do not require further processing. In some examples, pixel value processing unit 16 may store pixel values for pixels that require further processing in buffer 18, and may not store pixel values for pixels that do not require further processing in buffer 18.

Buffer 18 may comprise a 2-dimensional array of storage locations. In some examples, the number of storage locations in buffer 18 may be substantially similar to the number of pixels on a screen that displays the image. For instance, if the screen includes 640×480 pixels, buffer 18 may include 640× 480 storage locations. However, examples of this disclosure are not so limited. In some examples, the number of storage locations within buffer 18 may be larger or smaller than the number of pixels on the screen.

In some examples, pixel value processing unit 16 may store pixel values for pixels that require further processing within contiguous storage locations of buffer 18. The contiguous storage locations of buffer 18 may be contiguous rows or columns, or contiguous blocks. For example, pixel value processing unit 16 may receive a storage mode selection from a processor (not shown). The storage mode selection may indicate whether pixel value processing unit 16 should store pixel values for pixels that require further processing within contiguous rows or columns, or contiguous blocks of buffer 18.

GPU 12 may retrieve pixel values stored in buffer 18 for further processing. For example, pixel processing unit 16 may indicate to GPU 12 the number of pixel values stored in buffer 18. GPU 12, based on the indication, may retrieve the number of pixel values stored in buffer 18 for further processing. In this manner, GPU 12 may not unnecessarily process pixel values for pixels that do not require further processing, and may process the select few pixel values for pixels that require further processing.

For purposes of illustration, the following is an example implementation of pixel value storage system 10 provided for ease of understanding. However, aspects of this disclosure should not be considered limited to the following example.

In some examples, GPU 12 may be utilized in an image recognition application, such as an image-based computing application that supports so-called visual search. For example, GPU 12 may be part of the mobile device. GPU 12 may receive an image, such as an image of a product, and extract features of the image, referred to as feature descriptors. The mobile device may transmit the feature descriptors over a network to one or more servers. The one or more servers may compare the feature descriptors with features of images in a database. Based on the comparison, the one or more servers may transmit an estimation of a matching image, transmit a network link, such as a web page, for contents displayed in the image, or transmit other pertinent information. In an alternative example, the mobile device, rather than a server, may compare the feature descriptors with features of images in a downloaded database to find an estimation of a matching image.

To extract features of the image, GPU 12 may implement a Scale Invariant Feature Transform (SIFT). SIFT includes three stages comprising a scale stage, a keypoint pixel location stage, and a keypoint pixel descriptor stage. In general, SIFT includes identifying features of the image and generating feature descriptors for the identified features that are used for image recognition. The identified features may be points of interest within the image. The identified features may correspond to keypoint pixels as described in more detail below.

In the scale stage and keypoint pixel location stage, GPU 12 may begin with processing each and every pixel in the image to identify keypoint pixels. For these stages, the fixed data rate processing of GPU 12 may promote efficient pixel processing. Then, for the keypoint pixel descriptor stage, GPU 12 may not need to process every pixel in the image. Rather, GPU 12 may need to process a select few pixels in the image to define the keypoint feature descriptors for SIFT. As described in more detail, pixel value processing unit 16 may store the pixel values for the select few pixels that are needed for subsequent processing in the keypoint pixel descriptor stage in buffer 18, and not store pixel values for pixels that are not needed for further processing, e.g., not needed for further processing to define the keypoint pixel descriptors, e.g., the feature descriptors. In this manner, GPU 12 may process these select few pixels, which require further processing and which are less than all of the pixels of the image, instead of processing all of the pixels including pixels for which additional processing may not be required.

In accordance with the SIFT algorithm, in the scale stage, GPU 12 may process pixel values for pixels within the received image to generate a scale space for the image. Scale space may include multiple processed versions of the image, where each processed version of the image may be a scaled image. As one example, the processed versions of the image may include filtered versions of the image. For example, GPU 12 may filter the image with six low pass filters, where each filter is a filter with a different low pass bandwidth. By filtering the image with six low pass filters, the GPU may generate six low pass filtered images, e.g., low pass filter image 1 to low pass filter image 6. The utilization of six low pass filters is provided for illustration purposes. In alternate examples, GPU 12 may utilize more or fewer filters than six filters.

As another example, the processed versions of the image may include filtered and spatially downsampled versions of the image. For instance, GPU 12 may also spatially downsample each of the six low pass filtered images, in some examples. Spatial downsampling of an image includes blending pixels to reduce the number of pixels within the image. For example, to spatially downsample by a factor of two, GPU 12 may blend two pixels into a single pixel or multiple pixels with reduced resolution. In this manner, GPU 12 may reduce the total number of pixels by a factor of two.

In examples where GPU 12 low pass filters the image and downsamples the low pass filtered image, the low pass filtered and downsampled image may be referred to as the scaled image. In examples where GPU 12 low pass filters the image, but does not downsample the low pass filtered image, the low pass filtered image may be referred to as the scaled image. Accordingly, in the above example, GPU 12 may generate six scaled images, e.g., scaled image 1 to scaled image 6. The scaled images should not be considered limited to only filtered, or filtered and downsampled versions of the image. In general, GPU 12 may generate scaled images utilizing other processing techniques.

In accordance with the SIFT algorithm, in the keypoint pixel location stage, GPU 12 may determine the difference between pairs of the scaled images. GPU 12 may generate a difference image based on the difference between pairs of the scaled images. GPU 12 may determine the difference between pairs of the scaled images, on a pixel by pixel basis, utilizing the difference of Gaussians technique, although GPU 12 may utilize techniques other than the difference of Gaussians technique. For example, GPU 12 may determine the difference of Gaussians between scaled image 1 and scaled image 2, on a pixel by pixel basis, to generate difference image 1. GPU 12 may determine the difference of Gaussians between scaled image 2 and scaled image 3, on a pixel by pixel basis, to generate difference image 2, and so forth. For instance, GPU 12 may determine the difference of Gaussians between scaled image 5 and scaled image 6, on a pixel by pixel basis, to generate difference image 5.

Based on the difference images, e.g., difference images 1 to 5, GPU 12 may identify keypoint pixels. As one example, GPU 12 may select a block of 3×3 pixels within difference image 1 and co-located blocks within difference images 2 and 3. GPU 12 may then compare pixel values, e.g., a luminance (luma) value, for a pixel within one of the difference image to the pixel values of all the other pixels. For example, GPU 12 may compare the luma value for the center pixel within the 3×3 block of pixels of difference image 2 with the luma values of the other pixels within the 3×3 block of pixels of difference image 2 and the pixels within the co-located blocks within difference images 1 and 3 for a total of 26 comparisons. If the luma value of the center pixel is the maximum value or a minimum value, among the pixels of the 3×3 block, GPU 12 may identify the center pixel as a keypoint pixel. GPU 12 may iteratively perform the comparison on all of the pixels within difference images 1, 2, and 3 on multiple 3×3 block of pixels across difference image 2 to identify keypoint pixels within difference image 2.

The keypoint pixels may be located randomly and sparsely populated within the pixels of difference images 2, 3, and 4. For example, the number of keypoint pixels within difference images 2, 3, and 4 may be a small percentage of the total number of pixels within difference images 2, 3, and 4. In some instances, keypoint pixels of difference images 2, 3, and 4 may constitute less than 1% of the total pixels of difference images 2, 3, and 4, respectively.

GPU 12 may transmit output stream 14 of pixel values to pixel value processing unit 16 for each of the difference images that include the keypoint pixels, e.g., difference images 2, 3, and 4. There may be multiple examples of the types of output streams 14 that GPU 12 transmits to pixel value processing unit 16. In general, GPU 12 may utilize any technique to indicate that the pixel values in output stream 14 belong to keypoint pixels. As one example, output stream 14 may be an output stream of coordinate values within the difference images 2, 3, and 4 for the keypoint pixels. As another example, output stream 14 may be an output stream of color values, e.g., luma values and/or red-green-blue (RGB) values, for the keypoint pixels within the difference images 2, 3, and 4. In these examples, GPU 12 may not output the coordinate values or color values for the non-keypoint pixels, or may output a null value for the coordinate values or color values for the non-keypoint pixels. In yet another example, output stream 14 may be an output stream that includes histogram values of the pixel value of the keypoint pixels. In this example, GPU 12 may not output histogram values of pixel values of the non-keypoint pixels, or may output a null value for the histogram values of the non-keypoint pixels.

In this example, pixel value processing unit 16 may determine whether the received pixel values in output stream 14 are for keypoint pixels or non-keypoint pixels, e.g., by evaluating the pixel values in output stream 14. For example, if a pixel value is a null value, pixel value processing unit 16 may determine that the pixel value is a not coordinate value for a non-keypoint pixel. If a pixel value is a non-null value, pixel value processing unit 16 may determine that the pixel value is a coordinate value for a keypoint pixel.

Pixel value processing unit 16 may then store pixel values for the keypoint pixels in buffer 18, and not store the pixel values for the non-keypoint pixels in buffer 18. This storage approach may eliminate non-keypoint pixels from further processing, resulting in pixel value compaction. As used in this disclosure, pixel value compaction may indicate reduction in the number of pixels that need to be processed, where the number of pixels remaining in buffer 18 after compaction may be substantially less than the number of pixels in the original image. In some example, the number of pixels may be progressively reduced relative to the number of pixels at the start of each processing cycle by GPU 12.

GPU 12 may then retrieve pixel values for the keypoint pixels stored in buffer 18 for subsequent processing stages such as the keypoint descriptor stage. The keypoint descriptor stage may include keypoints refinement and descriptors generation. Keypoints refinement may include an algorithm with which GPU 12 may calculate three-dimensional spatial gradients of pixels in the difference images which may be in the vicinity of each keypoint. In this manner, GPU 12 may interpolate coordinates from the pixels in the vicinity of each keypoint from pixel resolution to sub-pixel resolution. Descriptors generation may include an algorithm with which GPU 12 may calculate primary spatial gradient at keypoint location as well as histogram of spatial gradients for three-dimensional areas around each keypoint location.

The histogram of spatial gradients, which may be considered as a histogram of pixel values of the image, may be one example of the keypoint feature descriptors. In some examples, GPU 12 may also store the histogram of pixel values in buffer 18. For example, GPU 12 may transmit the histogram of pixel values as part of output stream 14 to pixel value processing unit 16. Pixel value processing unit 16 may compare the histogram of pixel values to a threshold value. If the histogram of pixel values is greater than the threshold value, pixel value processing unit 16 may store such histogram of pixel values in buffer 18. If, however, the histogram of pixel values is less than the threshold value, pixel value processing unit 16 may not store such histogram of pixel values in buffer 18.

In some examples, pixel value processing unit 16 may count the number of keypoint pixels, whose pixel values are stored in buffer 18. Pixel value processing unit 16 may output a counter value that indicates the number of keypoint pixels, whose pixel values are stored in buffer 18, to GPU 12. In this manner, GPU 12 may know how many pixel values to retrieve from buffer 18, and may retrieve only those pixel values. As described in more detail, pixel value processing unit 16 may store the pixel values in contiguous storage locations of buffer 18.

Techniques described in this disclosure, in some examples, may allow pixel value compaction without increasing transfer latency, computation cycles, or requiring synchronization. For example, the Open Graphics Library (OpenGL™) specification, OpenGL ES 2.0 for example, developed by the Khronos Group allows a technique where a GPU transfers a data map that includes the locations for the sparsely populated keypoint pixels to a central processing unit (CPU). The CPU then compacts the pixel values for the keypoint pixels into a dense data map of much smaller size, and transfers the data map to the GPU for subsequent processing.

Such an approach, as allowed in the OpenGL ES 2.0 specification, may increase data transfer latency due to the transfer of pixel values back and forth between the CPU and GPU. Pixel value processing unit 16 may reduce such transfer latency because pixel value processing unit 16 may not need to transfer pixel values for keypoint pixels back to GPU 12. Also, in the OpenGL ES 2.0 approach, the CPU may require multiple CPU computation cycles to perform pixel value compaction for the keypoint pixels, which may be processing inefficient. Pixel value processing unit 16 may be capable of compacting the pixel values without adding any computation cycle. For example, pixel value processing unit 16 may be capable of compacting the pixel values within a single computation cycle, as one non-limiting example. Moreover, in the OpenGL ES 2.0 approach, the GPU and CPU may require synchronization so that the CPU is ready to receive the data map from the GPU, and vice-versa. Pixel value processing unit 16 may not require any synchronization with GPU 12. For example, GPU 12 may generate output stream 14 as it completes its processing without first ensuring that pixel value processing unit 16 is ready to receive output stream 14.

For instance, in some examples, pixel value processing unit 16 may be configured to perform limited functions such as those described in this disclosure. In these examples, pixel value processing unit 16 may not need to schedule any other tasks than those described. Pixel value processing unit 16 may be perpetually ready to receive output stream 14, and does not need to schedule specific times when it can receive output stream. For example, from the perspective of GPU 12, GPU 12 may believe that it is outputting output stream 14 to buffer 18. Pixel value processing unit 16 may function as an intermediate unit that compacts the pixel values. However, GPU 12 may not be knowledgeable of such functionality of pixel value processing unit 16 and may output stream 14 as it completes its processing.

Techniques described in this disclosure may also allow pixel value compaction without increases in programming complexity. For example, the Open Computing Language (OpenCL™) specification also developed by the Khronos Group allows a technique to modify program kernels, defined in accordance with the OpenCL specification, to sequence the pixel values for the keypoint pixels, and output the sequence into consecutive storage locations within a frame buffer.

The approach proposed by the OpenCL specification may increase the complexity of program kernels executing on the GPU, and may require execution overhead for synchronization among the kernels. Pixel value processing unit 16 may be capable of pixel value compaction without increases in complexity of the program kernels executing on GPU 12 because pixel value processing unit 16 may be external hardware that is external to GPU 12. Also, pixel value processing unit 16 may not require any additional synchronization among the program kernels executing on GPU 12.

In some examples, pixel value processing unit 16 may store pertinent pixel values in linear form or block form in buffer 18. Pixel value processing unit 16 may store the pixel values in linear form or block form in buffer 18 based on specific hardware of GPU 12 or software executing on GPU 12. For example, if GPU 12 is configured to implement the graphics pipeline for OpenGL ES 2.0, then each pixel value may include up to four channels representing the pixel value. In this example, pixel value processing unit 16 may compact the pixels, e.g., determine which pixel values should be stored in buffer 18, based on one or more of four channels for flexibility depending on need of applications.

Furthermore, although the preceding examples describe pixel processing unit 16 determining which pixel values should be stored in buffer 18 by comparing the pixel values to a threshold, such as a programmable threshold, aspects of this disclosure are not so limited. In some alternate examples, pixel value processing unit 16 may compare square of pixel values for energy, difference in pixel pairs of programmable spacing for gradients, and other statistics including histogram, etc to programmable thresholds to determine whether the pixel values should be stored in buffer 18.

Figure 2A:
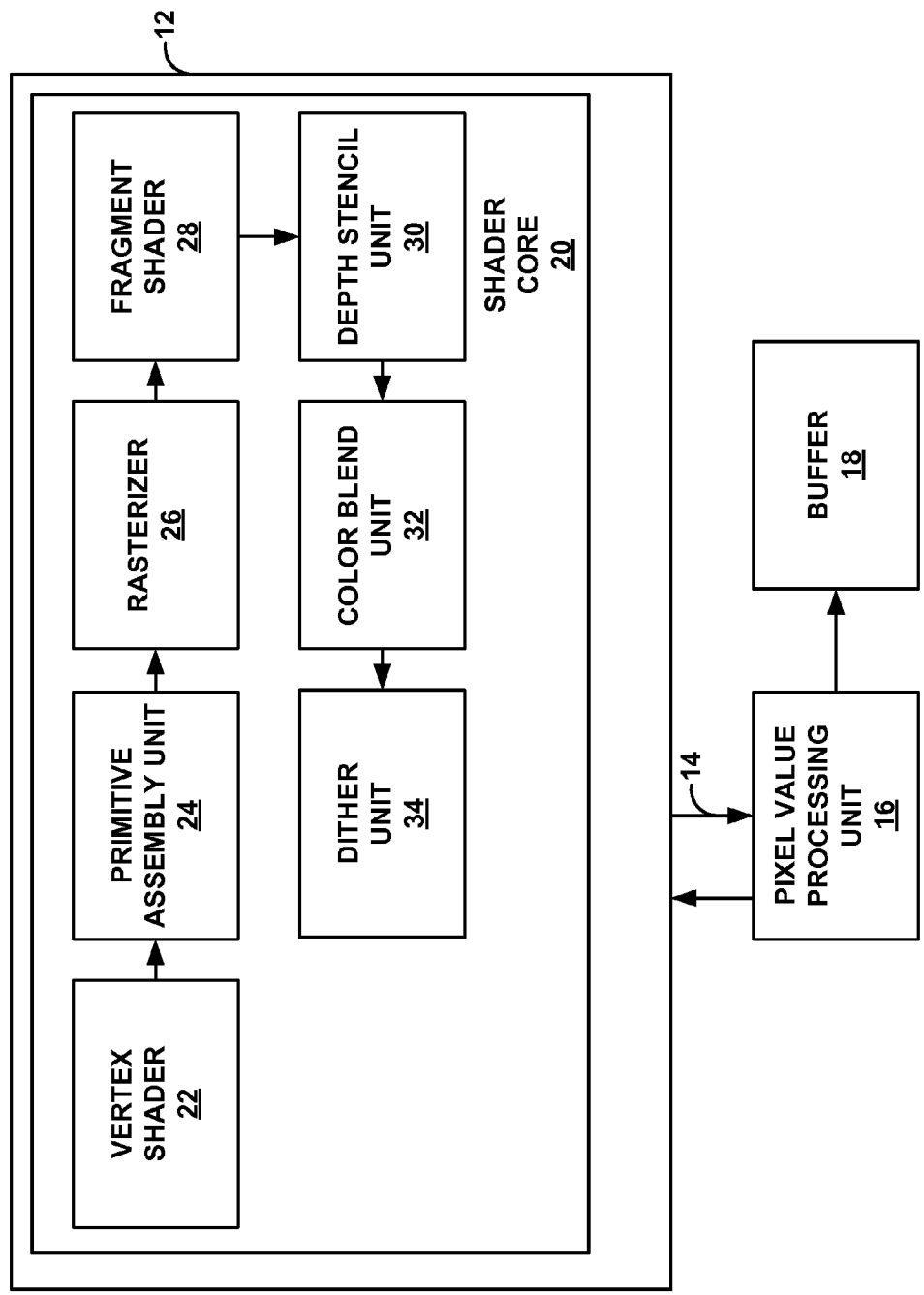
FIG. 2A is a block diagram illustrating one example of a graphics processing unit (GPU) of FIG. 1 in further detail.

FIG. 2A is a block diagram illustrating one example of GPU 12 of FIG. 1 in further detail. GPU 12, as illustrated in FIG. 2A, may implement a graphics pipeline similar to that described in the OpenGL ES 2.0 specification, which was released on Apr. 24, 2008, and is publicly available. As illustrated in FIG. 2A, GPU 12 includes shader core 20. Shader core 20 may be implemented as one or more hardware units, software modules executing on hardware units, or a combination thereof. As illustrated in FIG. 2A, shader core 20 includes vertex shader 22, primitive assembly unit 24, rasterizer 26, fragment shader 28, depth stencil unit 30, color blend unit 32, and dither unit 34. In general, these units of shader core 20 may perform functions similar to those ordinarily attributed to such components in the OpenGL ES 2.0 specification. These units of shader core 36 are provided for illustration purposes, and should not be considered as limiting. Shader core 36 may include more or fewer units than those illustrated in FIG. 2A.

A processor (not shown), such as a CPU external to GPU 12, may generate an image to be displayed on a screen. The processor may include a primitive processing unit that divides the image into a plurality of primitives which may be polygons such as triangles, as one example. The primitive processing unit may also determine the vertex coordinates for the vertices of the primitives, and the pixel values for the vertices. The primitive processing unit may transmit the coordinates and the pixel values of the vertices of the primitives to GPU 12.

Vertex shader 22 may calculate light values for the vertices based on the received pixel values. Primitive assembly unit 24 may compute coefficients of the linear equations for the primitives based on the coordinates of the vertices. Rasterizer 26 transforms the vertex coordinates into coordinates of a screen upon which the image is to be displayed. Rasterizer 26 may also compute the coordinates of the pixels within the primitives.

Fragment shader 28 may compute pixel values, such as color values and depth values, for the pixels within the primitives. Depth stencil unit 30 may utilize the depth values from fragment shader 28 to determine whether a pixel is occluded by another pixel, and if the pixel is fully occluded may remove that pixel from further processing. Color blend unit 32 may blend the color of different pixels together. Dither unit 34 may increase the color depth of the pixels to address the loss of detail during the processing.

In the example of FIG. 2A, the resulting output of dither unit 34, of shader core 20, may be output stream 14. In this example, output stream 14 may include pixel values such as coordinates of where the pixels are to be displayed on the screen, color values of the pixels, and other such pixel values. The pixel values in output stream 14 may be for consecutive pixels in the image. For example, the first pixel value may be for the pixel located in the top-left corner of the image, the second pixel value may be for the pixel located to the immediate right of the top-left corner of the image, and so forth in a raster fashion.

Pixel value processing unit 16 may receive output stream 14 and determine whether the pixel values for a particular pixel should be stored in buffer 18. For example, if the color value for a particular pixel is zero, then pixel value processing unit 14 may determine that pixel values for that pixel should not be stored in buffer 18. There may be other criteria with which pixel value processing unit 16 may determine whether the pixel values for a particular pixel should be stored in buffer 18.

Based on the determination, pixel value processing unit 16 may store the pixel values for pixels that should be stored into buffer 18. In some examples, pixel value processing unit 16 may store the pixel values in contiguous storage locations of buffer 18. As one example, pixel value processing unit 16 may store the pixel values in contiguous rows or columns of buffer 18. As another example, pixel value processing unit 16 may store the pixel values in contiguous blocks of buffer 18.

Figure 2B:
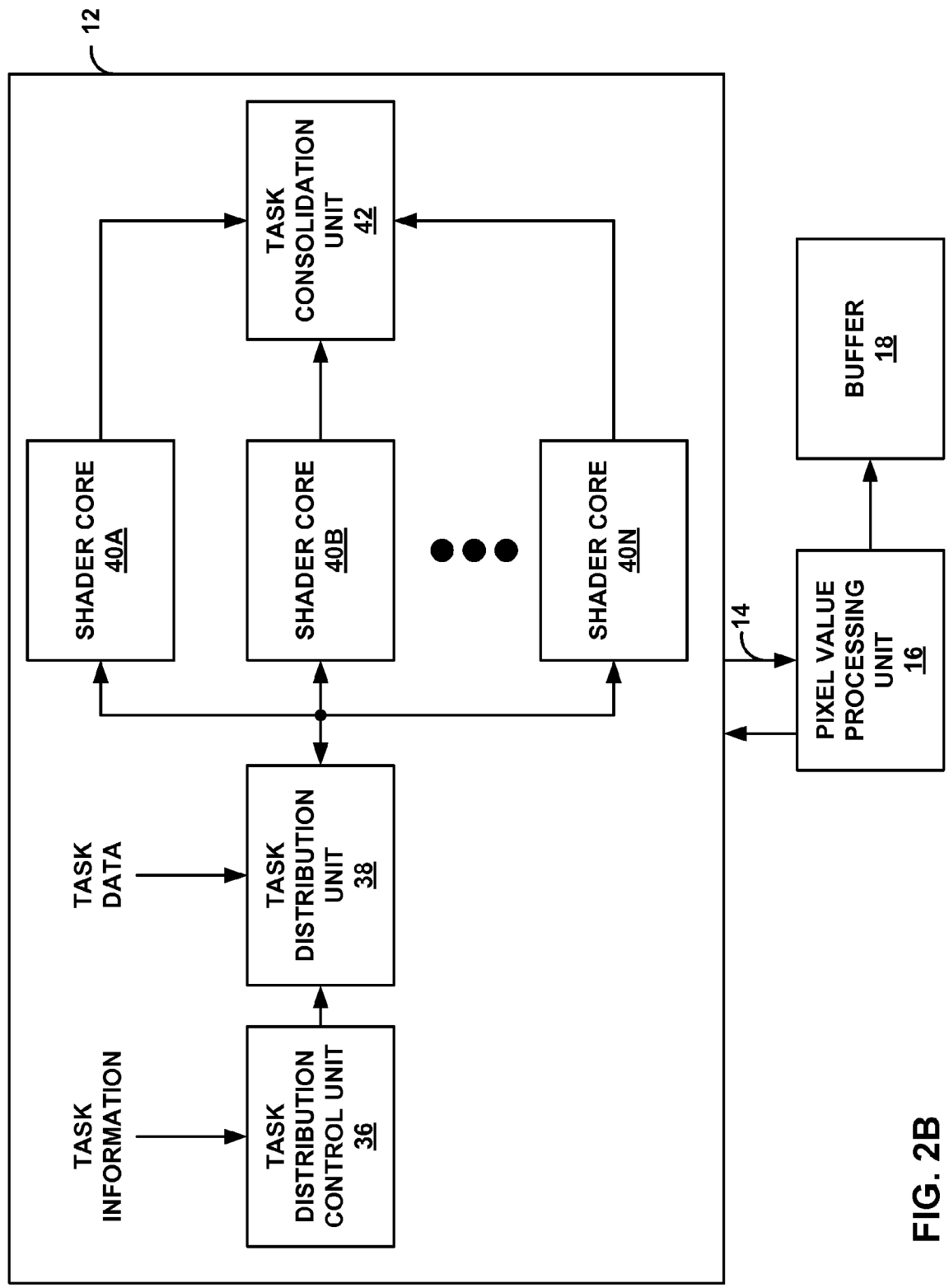
FIG. 2B is a block diagram illustrating another example of a graphics processing unit (GPU) of FIG. 1 in further detail.

FIG. 2B is a block diagram illustrating another example of GPU 12 of FIG. 1 in further detail. As illustrated in FIG. 2B, GPU 12 may include task distribution control unit 36, task distribution unit 38, one or more parallel shader cores 40A-40N (collectively referred to as shader cores 40), and task consolidation unit 42. Task distribution control unit 36, task distribution unit 38, shader cores 40, and task consolidation unit 42 may be implemented as one or more hardware units, software modules executing on hardware units, or a combination thereof.

In some examples, shader cores 40 may be substantially similar to shader core 20 (FIG. 2A). For instance, each one of shader cores 40 may implement one or more of the units of shader core 20 in the graphics pipeline. In alternate examples, shader cores 40 may implement other functions such as the Scale Invariant Feature Transform (SIFT) described above. In some other examples, shader cores 40 may implement the graphics pipeline illustrated in FIG. 2A, as well as perform other functions such as SIFT.

In the example of FIG. 2B, a processor (not shown) such as a CPU may divide an image into blocks, and assign tasks that are to be performed on each of the blocks. The processor may transmit task information to task distribution control unit 36. The task information indicates the manner in which the processor divided the image into blocks, such as coordinates of the blocks within the image. The processor may also transmit task data to task distribution unit 38. The task data may indicate what tasks should be performed on each of the blocks of the image.

Task distribution unit 38 may receive the task information from task distribution control unit 36. Based on the task data from the processor and the task information from task distribution control unit 36, task distribution unit 38 may assign each one of shader cores 40 to perform the tasks. For example, based on the type of task that is to be performed and the availability of each one of shader cores 40 to perform the task, task distribution unit 38 may schedule the times when the various shader cores 40 perform the tasks.

Each one of shader cores 40 may perform their assigned tasks and output results of their tasks to task consolidation unit 42. The results from each one of shader cores 40 may be pixel values for the various pixels within an image. Task consolidation unit 42 may consolidate the results of the tasks performed by shader cores 40 into a single output stream. The single output stream generated by task consolidation unit 42 may be output stream 14. For example, as described above, output stream 14 may include pixel values such as coordinates of pixels, luma values, color values, and other such pixel values.

Similar to the example illustrated in FIG. 2A, pixel value processing unit 16 may receive output stream 14 and determine whether the pixel values for a particular pixel should be stored in buffer 18. Based on the determination, in some examples, pixel value processing unit 16 may store the pixel values that should be stored in either contiguous rows or columns of buffer 18, or contiguous blocks of buffer 18.

Figure 3:
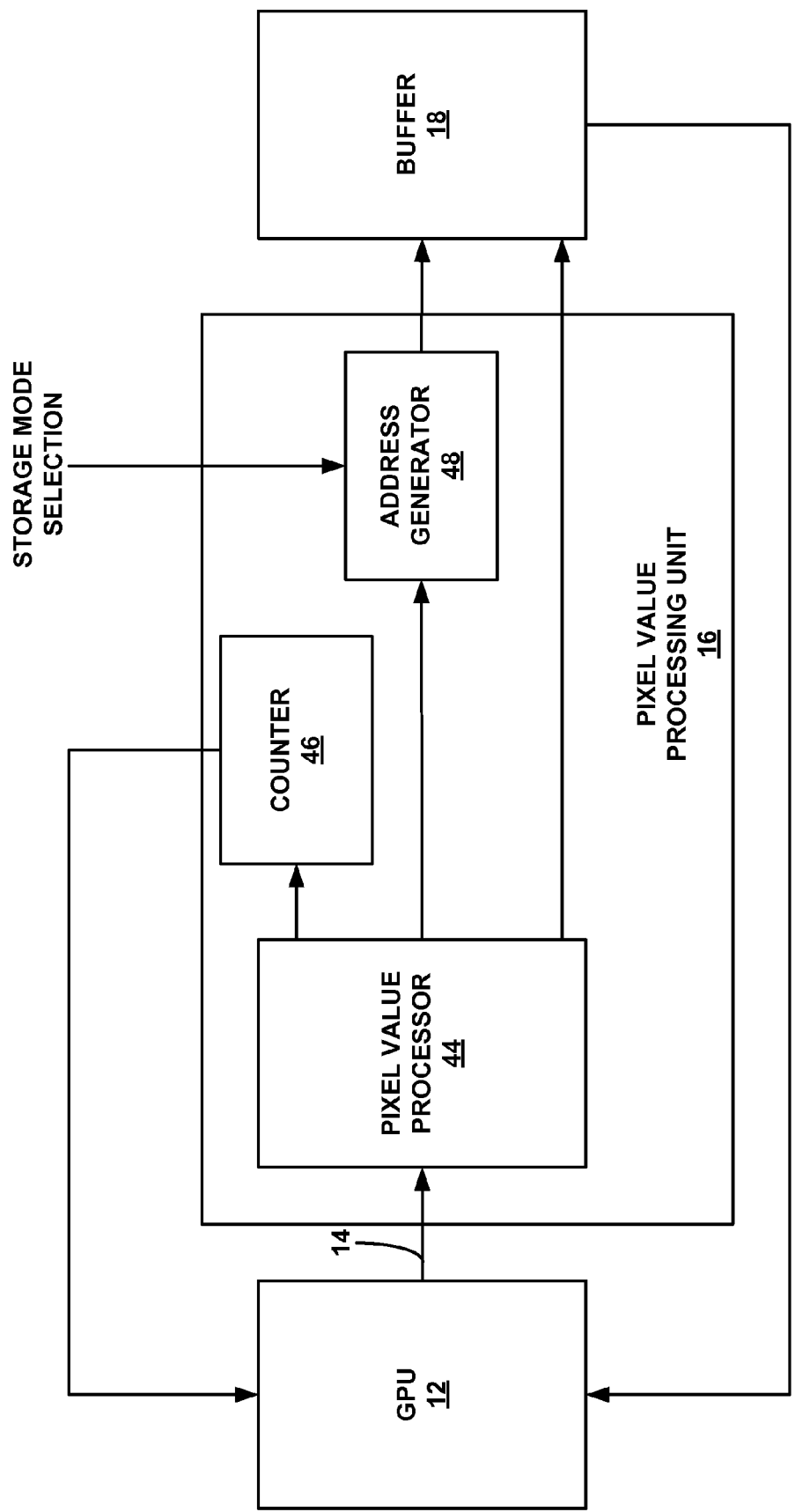
FIG. 3 is a block diagram illustrating an example of a pixel value processing unit of FIG. 1 in further detail.

FIG. 3 is a block diagram illustrating an example of pixel value processing unit 16 of FIG. 1 in further detail. In some examples, pixel value processing unit 16 may be a fixed-function hardware unit and referred to as a compaction unit. The phrase "fixed-function hardware unit" means that pixel value processing unit 16 may be designed to perform the functions ascribed to pixel value processing unit 16, and not other functions. Pixel value processing unit 16 may be implemented in one or more circuits or logic elements, as stand alone integrated or discrete logic circuitry that resides external to GPU 12 and buffer 18. For example, pixel value processing unit 16 may be a digital signal processor (DSP), an application specific integrated circuit (ASIC), a field programmable gate array (FPGA), or other equivalent integrated or discrete logic circuitry that is external to GPU 12 and buffer 18, and coupled to both. In some examples, where pixel value processing unit 16 is a DSP, ASIC, or FPGA, the DSP, ASIC, or FPGA may be designed to perform the functions ascribed to pixel value processing unit 16, and not designed perform any other functions.

Pixel value processing unit 16 may include pixel value processor 44, counter 46, and address generator 48. Pixel value processor 44 may receive output stream 14 from GPU 12. As described, output stream 14 may include pixel values for the pixels in the image processed by GPU 12. As one example, the pixels values may be pixel values for keypoint pixels or for both keypoint pixels and non-keypoint pixels in examples where GPU 12 implements SIFT, as described above. As another example, the pixel values may be for pixels processed in a graphics pipeline. The pixel values for pixels in output stream 14 may be for pixels that are sparsely and randomly located in an image that is processed by GPU 12.

There may be various types of pixel values in output stream 14. For example, the pixel values may include coordinate values of the pixels in the image to be displayed on the screen. The pixel values may also include color values of the pixels. In some examples, the pixel values may be coordinates, energy value, etc. depending on need of applications. Also, in some examples, the pixel values may be a histogram of pixel values calculated as part of the keypoint feature descriptors, as described above.

Pixel value processor 44 may receive output stream 14, and for each of the received pixel values for pixels, may determine whether to retain or discard the pixel values for each pixel. If the pixel values for a pixel are to be retained, pixel value processor 44 may transmit the pixel values for the retained pixel to buffer 18 for storage. As described below, pixel value processor 44 may store the pixel values for the retained pixel at a location within buffer 18 determined by address generator 48. In some examples, if pixel value processor 44 determines that the pixel values for a pixel are to be discarded, then pixel value processor 44 may eliminate those pixel values from further processing.

Pixel value processor 44 may utilize various criteria to determine whether to retain or discard the pixel values for a pixel. For example, in SIFT, pixel value processor 44 may store pixel values for keypoint pixels in buffer 18, and not store pixel values for non-keypoint pixels in buffer 18. In SIFT, the pixel values, including the coordinate values or color values, for non-keypoint pixels may be a null-value or a zero value based on the processing of GPU 12, and may be a value other than a null-value or zero value for keypoint pixels. In this example, pixel value processor 44 may determine that a pixel is a non-keypoint pixel if the received pixel value for that pixel is a null-value or a zero value, and may determine that a pixel is a keypoint pixel if the received pixel value for that pixel is not a null-value or a zero value.

As another example, pixel value processor 44 may determine the luminance of the color value of a pixel. If the luminance of that pixel is greater than a threshold luminance, pixel value processor 44 may determine that the pixel values for that pixel should be stored. If the luminance of that pixel is less than or equal to the threshold luminance, pixel value processor 44 may determine that the pixel values for that pixel should not be stored.

In either the SIFT example or the graphics pipeline example, output stream 14 may include pixel values for pixels in a predetermined order. As one example, the first received pixel value may be the pixel value for the top-left pixel of the image processed by GPU 12, the second received pixel value may be the pixel value for the pixel to the right of top-left pixel and so forth. In this example, pixel value processor 44 may determine which pixel values belong to which pixel based on the order in which pixel value processing unit 16 receive the pixel values in output stream 14. In this manner, pixel value processor 44 may be knowledgeable as to which pixels are retained for further processing, and which pixels are discarded from further processing.

The above example techniques utilized by pixel value processor 44 to determine whether to store pixel values or not store pixel values for a pixel in buffer 18 are provided for illustration purposes, and should not be considered as limiting. Pixel value processor 44 may utilize criteria in addition to or instead of the examples described above to determine whether to store pixel values or not store pixel values for a pixel in buffer 18.

After determining that pixel values for a particular pixel should be stored in buffer 18, pixel value processor 44 may transmit the pixel values for that pixel to frame 18 for storage, i.e., write the pixel values to buffer 18. In addition, address generator 48 may determine a location within buffer 18 where the pixel values for that pixel should be stored.

Figure 4A:
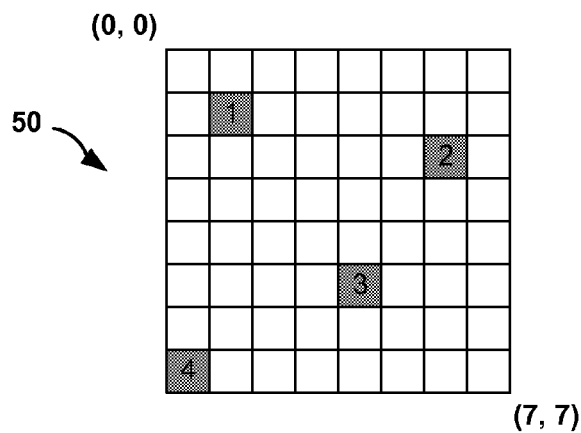
FIG. 4A is a graphical diagram illustrating pixels within an image that are to be stored in a buffer.
Figure 4B:
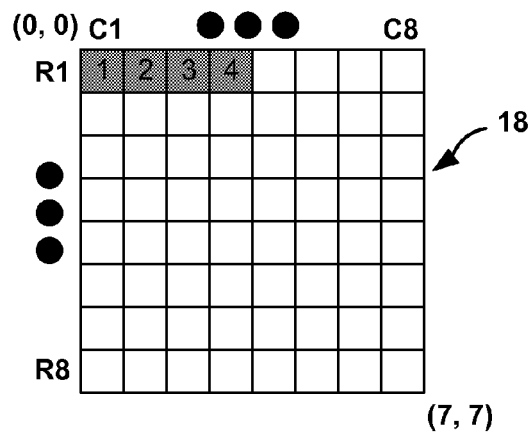
FIGS. 4B, 4C, and 4D are graphical diagrams illustrating pixel values stored in storage locations of one example of a buffer of FIG. 1.
Figure 4C:
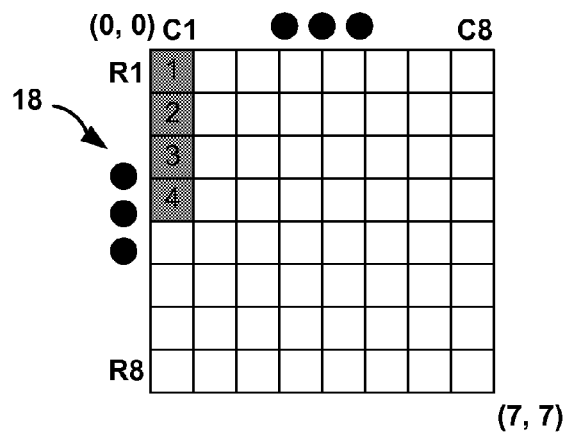
Figure 4D:
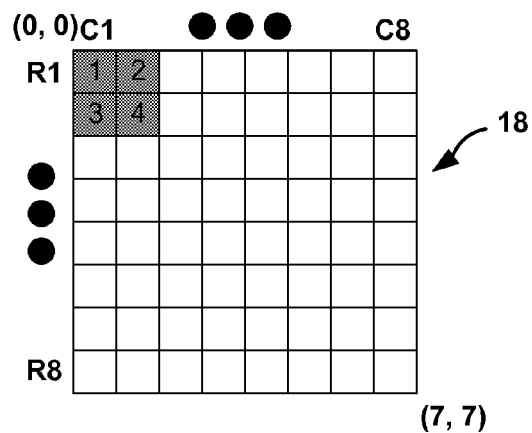

As illustrated in further detail in FIGS. 4B-4D, buffer 18 may be a two-dimensional array of storage locations. In some examples, the number of storage locations in buffer 18 may be substantially similar to the number of pixels on a screen. For instance, if the screen includes 640×480 pixels, buffer 18 may include 640×480 storage locations. However, in some examples, the number of storage locations within buffer 18 may be larger or smaller than the number of pixels on the screen.

Address generator 48 may generate storage addresses such that the storage addresses within buffer 18 are contiguous. Address generator 48 may operate in at least two different modes based on a storage mode selection. The storage mode selection may indicate whether address generator 48 should operate in a linear mode or a block mode.

In the linear mode, address generator 48 may generate the addresses for the storage locations within buffer 18 for pixel values for pixels that are to be stored in contiguous rows or columns within buffer 18. In the block mode, address generator 48 may generate the addresses for the storage locations within buffer 18 for pixel values for pixels that are to be stored in contiguous blocks within buffer 18. For example, assume that buffer 18 comprises 8×8 storage locations. In this example, buffer 18 may be divided into four 4×4 contiguous storage locations. In the block mode, address generator 48 may generate addresses for the pixels, whose pixel values are to be stored, such that the first sixteen pixel values are stored in the first 4×4 block of storage locations, the second sixteen pixel values are stored in the second 4×4 block of storage locations, and so forth.

Pixel value processor 44 may store pixel values for the pixels, e.g., coordinate values, color values, histogram values, as three examples, within buffer 18 at the addresses defined by address generator 48. For example, for a first pixel, address generator 48 may generate the address within buffer 18 to be (1, 1). Pixel value processor 44 may store the pixel values for the first pixel at location (1, 1) in buffer 18. For a second pixel, address generator 48 may generate the address within buffer 18 to be (1, 2). Pixel value processor 44 may store the pixel values for the second pixel at location (1, 2) in buffer 18, and so forth.

As illustrated in FIG. 3, pixel value processing unit 16 may also include counter 46. Counter 46 may count the number of pixels whose pixel values are stored in buffer 18. For example, when GPU 12 implements feature descriptor processing to support SIFT, for each difference image, e.g., difference images 2, 3, and 4, as described above, counter 46 may count the number of pixels stored in buffer 18.

Counter 46 may transmit the number of pixels whose pixel values are stored in buffer 18 to GPU 12. Based on the count of counter 46, GPU 12 may be knowledgeable as to how many pixel values should be retrieved from buffer 18. In some examples, for a first processing pass, GPU 12 may being retrieving pixel values from the top-left storage location of buffer 18, and move in a raster fashion to retrieve the number of pixel values indicated by counter 46. GPU 12 may know at which storage location in buffer 18 was the last storage location from which GPU 12 retrieved data in the first pass. Then, for a subsequent pass, GPU 12 may retrieve pixel values from the next storage location within buffer 18.

In this manner, GPU 12 may be to efficiently utilize its fixed data rate processing even for variable data rate processing. For example, without pixel value processing unit 16, GPU 12 would store the pixel values for every single pixel within buffer 18, even though not all pixels are required for further processing. Then, for further processing, GPU 12 would retrieve all of the store pixel values, evaluate each of the pixel values, and determine whether further processing is needed. Such evaluation of all of the pixels may be computationally inefficient. For example, if less than 1% of the pixels require further processing, GPU 12 may waste computational resources on 99% of the pixels that require no further processing.

With pixel value processing unit 16 coupling between GPU 12 and buffer 18, pixels that are not required for further processing may not be stored in buffer 18. Instead, pixel value processing unit 16 may discard such pixels that are not required for further processing. Counter 46 would indicate to GPU 12 how many pixel values to retrieve, and GPU 12 would then retrieve the number of pixel values indicated by counter 46. In this manner, GPU 12 may not waste computation resources evaluating pixel values for pixels that require no further processing. Also, GPU 12 may be able to terminate its processing after processing the number of pixels indicated by counter 46.

Pixel value processing unit 16 may also be able to determine which pixel values should be retained and which pixel values should be discarded within a single computation cycle. For example, pixel value processing unit 16 may not require any feedback of the pixel values, or require processor scheduling. For instance, pixel value processing unit 16 may allow the pixel values in output stream 14, that are to be stored, to feed through in a single pass from GPU 12 to buffer 18 without any synchronization between pixel value processing unit 16 and GPU 12, or require multiple processing of the pixel values.

Furthermore, pixel value processing unit 16 may allow GPU 12 to utilize its fixed data rate processing for variable data rate processing without extensive modification to the software code executing on GPU 12. For example, modifying software code executing on GPU 12 to perform pixel value compaction may be complex and require scheduling among the different instructions executing on GPU 12. With pixel value processing unit 16, complex changes to the instructions executing on GPU 12, or any change to the scheduling of the instructions executing on GPU 12 may not be required. In other words, pixel value processing unit 16 may be transparent to GPU 12 programming, may require zero run-time overhead on GPU 12, and may be easily configured to operate with GPU 12.

Moreover, pixel value processing unit 16 may be able to support pixel value compaction for different size images. Pixel value processing unit 16 may be useful for other applications as well, which may further enhance the performance of GPU 12.

In some of the example implementations described in this disclosure, GPU 12 may not need to repeatedly clear buffer 18. For example, when GPU 12 implements SIFT to generate output stream 14, pixel value processor 44 may store the pixel values for keypoint pixels from the first difference image within buffer 18. Then, without clearing buffer 18, pixel value processor 44 may store the pixel values for the keypoint pixels from the second difference image within buffer 18, and so forth. In this example, GPU 12 may be able to identify which keypoint pixels belong to the first difference image and which keypoint pixels belong to the second difference image, based on the count of counter 46. Efficient power utilization and processing may be promoted by reducing the number of times buffer 18 needs to be cleared.

FIG. 4A is a graphical diagram illustrating pixels within an image that are to be stored in buffer 18. FIGS. 4B, 4C, and 4D are graphical diagrams illustrating pixel values stored in storage locations of one example of buffer 18. In the example illustrated in FIG. 4A, image 50 may be an image processed by GPU 12 and may include 64 pixels starting from a pixel located at (0, 0) to a pixel located at (7, 7). In this example, assume that the screen on which image 50 is to be displayed also include 64 pixels.

In FIG. 4A, the pixels in gray scale are pixels which are to be stored in buffer 18. For example, the pixel value for the pixel located at (1, 1) in image 50 may be 1; the pixel value for the pixel located at (6, 2) in image 50 may be 2; the pixel value for the pixel located at (5, 4) in image 50 may be 3; and the pixel value for the pixel located at (0, 7) in image 50 may be 4. The pixel values for all other pixels may be a null-value.

Pixel value processing unit 16 may receive the pixel values of image 50 in form of output stream 14. In this example, the first pixel value in output stream 14 may be the pixel value for the pixel located at (0, 0) in image 50. The second pixel value in output stream 14 may be the pixel value for the pixel located at (1, 0) in image 50, and so forth. In this example, the pixel value for the pixel after the pixel located at (7, 0) may be the pixel value for the pixel located at (1, 0), and so forth.

In this example, pixel value processor 44 may determine that only the pixel values for the pixels located at (1, 1), (6, 2), (5, 4), and (0, 7) should be stored in buffer 18 because the pixel values for these pixels are not null-values and the pixel values for all other pixels are null-values. Also, in this example, after pixel value processor 44 determines that pixel values of a pixel should be stored, counter 46 may increment its counter. In this example, at the conclusion of output stream 14, counter 46 may indicate to GPU 12 that buffer 18 stored four pixels in this pass. In this manner, GPU 12 may be knowledgeable as to how many pixel values it should retrieve from buffer 18 for subsequent processing.

For the pixel values that are to be stored in buffer 18, address generator 48 may determine the location for where the pixel values should be stored in buffer 18. As described above, address generator 48 may determine the address at which the pixel values should be stored based on whether address generator 48 is operating in the linear mode or the block mode. In either operation mode, counter 46 may count the number of pixels whose pixel values are stored in buffer 18.

FIGS. 4B and 4C illustrate storage of pixel values in buffer 18 when address generator 48 is operating in linear mode. For example, in linear mode, address generator 48 may generate addresses in buffer 18 for contiguous storage locations within a column or row of buffer 18. For instance, in the example of FIG. 4B, address generator 48 generates addresses for the pixel values to be stored in contiguous storage locations within row R1. In the example of FIG. 4C, address generator 48 generates addresses for the pixel values to be stored in contiguous storage locations within column C1. Pixel value processor 44 may store the pixel values in the contiguous rows or columns based on the address generated by address generator 48.

FIG. 4D illustrates storage of pixel values in buffer 18 when address generator 48 is operating in block mode. In the block mode, buffer 18 may be considered as being divided into a plurality of blocks that each encompasses at least one row and at least one column. For instance, in the example of FIG. 4D, buffer 18 may be divided into sixteen blocks, where each block includes 2×2 storage locations. In this example, address generator 48 may generate addresses for the storage locations that encompass the first two storage location of row R1 and R2, and the first two storage location of column C1 and C2 to store the first four pixel values. As illustrated in FIG. 4D, pixel value processor 44 may store the pixel values within the first block of buffer 18 which encompasses the first two storage locations of row R1 and row R2, and the first two storage locations of column C1 and column C2.

Figure 5:
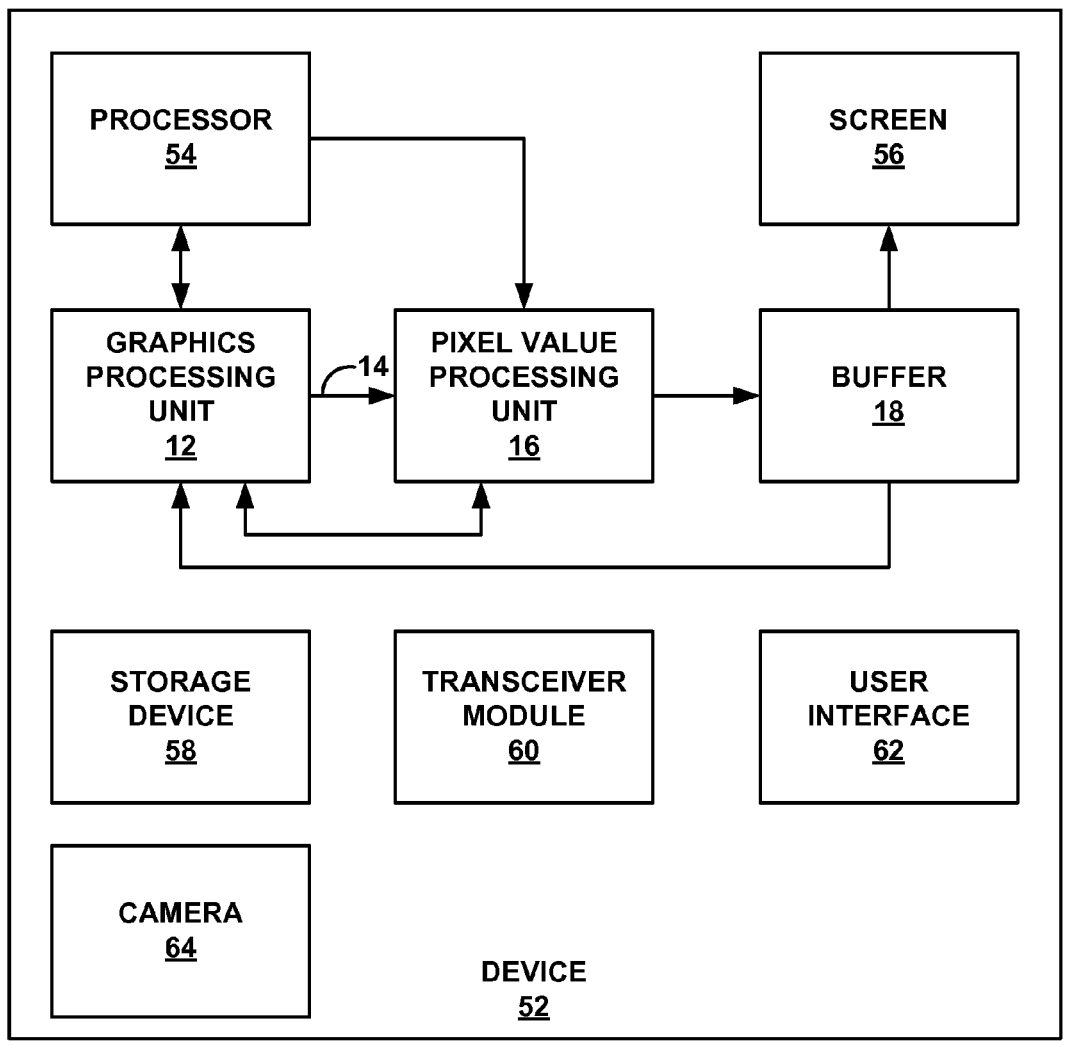
FIG. 5 is a block diagram illustrating a device that may be configured to implement aspects of this disclosure.

FIG. 5 is a block diagram illustrating a device 52 that may be configured to implement aspects of this disclosure. Examples of device 52 include, but are not limited to, wireless communication devices, mobile wireless telephones, personal digital assistants (PDAs), video gaming consoles coupled to video displays, mobile video conferencing units, laptop computers, desktop computers, tablet computers, television set-top boxes, televisions with integrated media decoders, digital media players, portable gaming devices, and the like. Device 52 may include graphic processing unit (GPU) 12, pixel value processing unit 16, buffer 18, processor 54, screen 56, storage device 58, transceiver module 60, user interface 62, and camera 64.

Device 52 may include additional modules or units not shown in FIG. 5 for purposes of clarity. For example, device 52 may include a speaker and a microphone, neither of which are shown in FIG. 5, to effectuate telephonic communications in examples where device 52 is a mobile wireless telephone, or a speaker where device 52 is a media player. Furthermore, the various modules and units shown in device 52 may not be necessary in every example of device 52. For example, screen 56 and user interface 62 may be external to device 52 in some examples. Also, in some examples, camera 64 may not be needed, or may be external to device 52.

GPU 12, pixel value processing unit 16, and buffer 18, of FIG. 5, may be substantially similar to the GPU 12, pixel value processing unit 16, and buffer 18 as illustrated in FIGS. 1-4. For example, GPU 12, pixel value processing unit 16, and buffer 18, of FIG. 5, may perform functions substantially similar to those described above with respect to FIGS. 1-4.

Processor 54 may execute one or more applications. Some examples of applications executed by processor 54 include, but are not limited to, web browsers, e-mail applications, spreadsheets, video games, or other applications that generate viewable content for display. Another example of the applications executed by processor 54 includes an image recognition application.

For example, a user of device 52 may take a picture of an image with camera 64. The user may then execute an image recognition application with processor 54. Processor 54 may provide the image taken by camera 64 to GPU 12, and cause GPU 12 to perform SIFT to extract features from the image. Processor 54 may then cause transceiver module 60 to transmit the extracted features to one or more servers. The one or more servers may compare the extracted features with features of images in a database.

Based on the comparison, the one or more servers may transmit an estimation of a matching image or transmit a network link, such as a web page, for contents displayed in the image to transceiver module 60, which in turn provides the estimation of the matching image or web page to processor 54. In an alternative example, processor 54, rather than a server, may compare the extracted features with features of images in a downloaded database to find an estimation of a matching image. Processor 54 may then display the estimation of the matching image or web page to the user via screen 56.

Instructions for the applications executed by processor 54 may be stored within storage device 58. In some instances, processor 54 may download the one or more applications via transceiver module 60. Processor 54 may execute the one or more applications based on a selection by a user via user interface 62. In some examples, processor 54 may execute the one or more applications without user interaction.

Processor 54 may also perform functions ascribed to the processor described above. For example, processor 54 may select the mode of operation of pixel value processing unit 16. For example, as described above, address generator 48 of pixel value processing unit 16 may generate addresses for locations within buffer 18 that are in contiguous rows or columns, e.g., linear mode, or in contiguous blocks, e.g., block mode. Processor 54 may instruct address generator 48 to operate in the linear mode or block mode.

As another example, processor 54 may generate the image that is to be displayed on screen 56. For example, processor 54 may generate an image based on the application that it is executing. Processor 54 may also include a primitive processing unit which divides the image into a plurality of primitives, determines the vertex coordinates for the vertices of the primitives, and the pixel values for the vertices, as described above with respect to FIG. 2A. As yet another example, processor 54 may divide an image into blocks, assign tasks that are to be performed on each of the blocks, and transmit the task information and task data to GPU 12, as described above with respect to FIG. 2B.

Examples of processor 54 include, but are not limited to, a DSP, a general purpose microprocessor, an ASIC, an FPGA, or other equivalent integrated to discrete logic circuitry. Storage device 58 may comprise one or more computer-readable storage media. Examples of storage device 58 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor.

In some aspects, storage device 58 may include instructions that cause processor 54 and/or pixel value processing unit 16 to perform the functions ascribed to processor 54 and pixel value processing unit 16 in this disclosure. Accordingly, storage device 58 may be a computer-readable storage medium comprising instructions that cause pixel value processing unit 16 to perform various functions.

Storage device 58 may, in some examples, be considered as a non-transitory storage medium. The term "non-transitory" may indicate that the storage medium is not embodied in a carrier wave or a propagated signal. However, the term "non-transitory" should not be interpreted to mean that storage device 58 is non-movable. As one example, storage device 58 may be removed from device 52, and moved to another device. As another example, a storage device, substantially similar to storage device 58, may be inserted into device 52. In certain examples, a non-transitory storage medium may store data that can, over time, change (e.g., in RAM).

Examples of user interface 62 include, but are not limited to, a trackball, a mouse, a keyboard, and other types of input devices. User interface 62 may also be a touch screen and may be incorporated as a part of screen 56. Transceiver module 60 may include circuitry to allow wireless or wired communication between device 52 and another device or a network. Transceiver module 60 may include modulators, demodulators, amplifiers and other such circuitry for wired or wireless communication. Camera 64 may be any type of camera that can take an image. Camera 64 may be formed within device 52, or may be external to device 52 and coupled to device 52.

Screen 56 may comprise a liquid crystal display (LCD), a cathode ray tube (CRT) display, an organic light emitting diode (OLED) display, a plasma display, or another type of display device. Screen 56 includes a plurality of pixels arranged horizontally and vertically in a 2 dimensional (2-D) pixel array. For example, screen 56 may include 640×480 pixels arranged horizontally and vertically.

FIG. 6 is a flow chart illustrating an example operation of pixel value processing unit 16. For purposes of illustration only, reference is made to FIGS. 1-4.

Pixel value processing unit 16 may receive an output stream from GPU 12 that includes pixel values for one or more pixels in an image processed by GPU 12 (66). For instance, GPU 12 may graphics process an image to generate output stream 14 that includes pixel values for one or more pixels within the processed image. For example, GPU 12 may implement the graphics pipeline as illustrated in FIG. 2A to generate output stream 14. As another example, GPU 12 may implement SIFT as described above.

In SIFT, GPU 12 may receive an image from processor 54. GPU 12 may then low pass filter the received image with low pass filters with different low pass bandwidths to generate scaled versions of the image. In some example, GPU 12 may low pass filter the image and downsample the resulting images to generate scaled versions of the image.

GPU 12 may then identify keypoint pixels within the scaled versions of the image. For example, GPU 12 may determine the difference between pairs of the scaled version of the images. GPU 12 may then locate the pixels whose luma pixel value within co-located blocks of at least three of the difference images is either the maximum or minimum luma value. The pixels with the maximum or minimum luma value may be keypoint pixels.

Pixel value processing unit 16, which may be external to GPU 12 and coupled to GPU 12, may determine whether the pixel values in output stream 14 are for pixels that require further processing (68). Pixel value processing unit 16 may utilize various criteria to determine whether the pixel values in output stream 14 are for pixels that require further processing. For example, in SIFT, the pixel values for non-keypoint pixels may be a null-value or a zero value, and may be a value other than a null-value or zero value for keypoint pixels. In this example, pixel value processing unit 16 may determine that pixels whose values are not a null-value or a zero value may be pixels that require further processing, e.g., keypoint pixels. In some examples, for pixels that do not require further processing, pixel value processing unit 16 may eliminate those pixels from further processing.

Pixel value processing unit 16, which may also be coupled to buffer 18, may store the pixel values for the pixels that require further processing in buffer 18 (70). For example, pixel value processing unit 16 may generate addresses within buffer 18 for where to store the pixel values for pixels that are required for further processing. Pixel value processing unit 16 may then store the pixel values for the pixels that require further processing in the storage locations of buffer 18 whose addresses correspond to the generated addresses.

Also, in some examples, pixel value processing unit 16 may determine whether the pixel values are for pixels that require further processing and store such pixel values within a single computational pass of pixel value processing unit 16. For example, pixel value processing unit 16 may not require any of the pixel values to feedback through pixel value processing unit 16, and may provide for a direct path from GPU 12 to buffer 18. Also, pixel value processing unit 16 may not require any synchronization with GPU 12. For example, GPU 12 may be able to transmit output stream 14 to pixel value processing unit 16 without needing to indicate to pixel value processing unit 16 that GPU 12 is about to transmit output stream 14.

FIG. 7 is a flow chart illustrating another example operation of pixel value processing unit 16. For purposes of illustration only, reference is made to FIGS. 3 and 5.

Address generator 48, of pixel value processing unit 16, may receive a mode of operation from a processor, such as processor 54 (72). Address generator 48 may then generate addresses for where the pixel values for the pixels that require further processing are stored in buffer 18 based on the received mode of operation.

For example, the received mode of operation may be at least one of a linear mode and a block mode. In instances where the received mode of operation is the linear mode, address generator 48 may generate addresses within contiguous rows or columns of buffer 18 (74). In instances where the received mode of operation is the block mode, address generator 48 may generate addresses within contiguous blocks of buffer 18 (76).

FIG. 8 is a flow chart illustrating another example operation of pixel value processing unit 16. For purposes of illustration only, reference is made to FIG. 3.

Counter 46 may count a number of pixels stored in buffer 18 (78). For example, after pixel value processor 44 determines that pixel values for a pixel should be store, counter 46 may increment a counter to indicate that pixel values for a pixel are stored in buffer 18. Counter 46 may repeat this step for every pixel whose pixel values are stored in buffer 18.

GPU 12 may retrieve pixel values stored in buffer 18 based on the count (80). For example, counter 46 may indicate how many pixels were stored in buffer 18 in a current processing pass. GPU 12 may then be knowledgeable as to the number of pixels stored in buffer 18, and may retrieve pixel values only for those pixels that require further processing.

GPU 12 may then further process the retrieved pixel values (82). In this manner, GPU 12 may be able to utilize its fixed data rate processing even for variable data rate processing. In this example, because GPU 12 may only retrieve the pixel values for pixels that require further processing, and not the pixel values for pixels that do not require further processing, GPU 12 may not waste computational resources evaluating pixel values for pixels that do not require further processing.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage device may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a fixed-function pixel value processing unit coupled to a graphics processing unit (GPU) and external to the GPU, an output stream from the GPU that includes pixel values for one or more pixels in an image processed by the GPU, wherein the fixed-function pixel value processing unit is perpetually ready to receive the output stream from the GPU and process the output stream without scheduling;
evaluating, with the fixed-function pixel value processing unit, the pixel values in the output stream;
determining, with the fixed-function pixel value processing unit, which pixels require further processing by the GPU based on the evaluation of the pixel values in the output stream, wherein determining which pixels require further processing by the GPU comprises determining which pixels require further processing by the GPU in a single computational cycle of the fixed-function pixel value processing unit and without synchronization between the fixed-function pixel value processing unit and the GPU; and
storing, in a buffer that is external to the fixed-function pixel value processing unit and coupled to the fixed-function pixel value processing unit, the pixel values for the pixels that require further processing by the GPU.

2. The method of claim 1, further comprising:
generating addresses within the buffer for the pixel values for the pixels determined to require further processing, wherein storing the pixel values for the pixels that require further processing comprises storing the pixel values for the pixels that require further processing at the generated addresses of the buffer.

3. The method of claim 2, further comprising:
receiving a mode of operation,
wherein generating addresses within the buffer comprises generating addresses within the buffer based on the received mode of operation.

4. The method of claim 3, wherein the mode of operation comprises at least one of a linear mode and a block mode, wherein generating addresses within the buffer comprises generating addresses within contiguous rows or columns of the buffer when the mode of operation comprises the linear mode, and wherein generating addresses within the buffer comprises generating addresses within contiguous blocks of the buffer when the mode of operation comprises the block mode.

5. The method of claim 1, further comprising:
counting a number of pixels whose pixel values are stored in the buffer;
retrieving the pixel values for the pixels that require further processing based on the counted number of pixels; and
processing the retrieved pixel values for the pixels that require further processing.

6. The method of claim 1, further comprising:
generating scaled versions of the image; and
identifying keypoint pixels based on the scaled versions of the image,
wherein determining which pixels require further processing comprises determining that the identified keypoint pixels require further processing, and
wherein storing the pixel values for the pixels that require further processing comprises storing the pixel values for the identified keypoint pixels in the buffer.

7. The method of claim 1, wherein the pixel values comprise at least one of coordinate values and color values.

8. The method of claim 1, further comprising eliminating from further processing pixel values for pixels that do not require further processing.

9. The method of claim 1, further comprising not storing pixel values in the buffer for pixels that do not require further processing by the GPU.

10. An apparatus comprising:
a graphics processing unit (GPU) configured to process an image to generate an output stream that includes pixel values for one or more pixels within the processed image;
a buffer; and
a fixed-function pixel value processing unit that is external to the GPU, is coupled to the GPU and the buffer, and configured to:
receive the output stream;
evaluate the pixel values in the output stream;
determine which pixels require further processing by the GPU based on the evaluation of the pixel values in the output stream, wherein the fixed-function pixel value processing unit is configured to determine which pixels require further processing by the GPU in a single computational cycle of the fixed-function pixel value processing unit and without synchronization between the fixed-function pixel value processing unit and the GPU; and
store the pixel values for the pixels that require further processing by the GPU in the buffer,
wherein the fixed-function pixel value processing unit is perpetually ready to receive the output stream from the GPU and process the output stream without scheduling.

11. The apparatus of claim 10, wherein the fixed-function pixel value processing unit is further configured to generate addresses within the buffer for the pixel values for the pixels determined to require further processing, and wherein the fixed-function pixel value processing unit stores the pixel values for the pixels that require processing at the generated addresses of the buffer.

12. The apparatus of claim 11, wherein the fixed-function pixel value processing unit is further configured to receive a mode of operation, and wherein the fixed-function pixel value processing unit generates the addresses within the buffer based on the received mode of operation.

13. The apparatus of claim 12, wherein the mode of operation comprises at least one of a linear mode and a block mode, wherein the fixed-function pixel value processing unit generates the addresses within contiguous rows or columns of the buffer when the mode of operation comprises the linear mode, and generates the addresses within contiguous blocks of the buffer when the mode of operation comprises the block mode.

14. The apparatus of claim 10, wherein the fixed-function pixel value processing unit is further configured to count a number of pixels whose pixel values are stored in the buffer, wherein the GPU retrieves the pixel values for the pixels that require further processing from the buffer based on the counted number of pixels, and wherein the GPU processes the retrieved pixel values for the pixels that require further processing.

15. The apparatus of claim 10, wherein the GPU is further configured to generate scaled versions of the image, and identify keypoint pixels based on the scaled versions of the image, wherein the fixed-function pixel value processing unit determines that the identified keypoint pixels require further processing, and stores the pixel values for the identified keypoint pixels in the buffer.

16. The apparatus of claim 10, wherein the pixel values comprise at least one of coordinate values and color values.

17. The apparatus of claim 10, wherein the fixed-function pixel value processing unit is further configured to eliminate from further processing pixel values for pixels that do not require further processing.

18. The apparatus of claim 10, wherein the fixed-function pixel value processing unit is configured to only evaluate the pixel values in the output stream, determine which pixels require further processing, store the pixel values for the pixels that require further processing in the buffer, generate addresses within the buffer for the pixel values for the pixels determined to require further processing, and count a number of pixels whose pixel values are stored in the buffer.

19. The apparatus of claim 10, wherein the fixed-function pixel value processing unit is further configured to not store pixel values in the buffer for pixels that do not require further processing by the GPU.

20. The apparatus of claim 10, wherein the apparatus comprises a wireless communication device.

21. An apparatus comprising:
a graphics processing unit (GPU);
a buffer; and
a fixed-function pixel value processing unit that is external to the GPU and coupled to the GPU and the buffer and that comprises:
  means for receiving an output stream from the GPU that includes pixel values for one or more pixels in an image processed by the GPU, wherein the means for receiving of the fixed-function pixel value processing unit is perpetually ready to receive the output stream from the GPU and process the output stream without scheduling;
  means for evaluating the pixel values in the output stream;
  means for determining which pixels require further processing by the GPU based on the evaluation of the pixel values in the output stream, wherein the means for determining determine which pixels require further processing by the GPU in a single computational cycle of the fixed-function pixel value processing unit and without synchronization between the fixed-function pixel value processing unit and the GPU; and
  means for storing, in the buffer, the pixel values for the pixels that require further processing by the GPU.

22. The apparatus of claim 21, further comprising:
means for generating addresses within the buffer for the pixel values for the pixels determined to require further processing,
wherein the means for storing the pixel values for the pixels that require further processing comprises means for storing the pixel values for the pixels that require further processing at the generated addresses of the buffer.

23. The apparatus of claim 22, further comprising:
means for receiving a mode of operation,
wherein the means for generating addresses within the buffer comprises means for generating addresses within the buffer based on the received mode of operation.

24. The apparatus of claim 23, wherein the mode of operation comprises at least one of a linear mode and a block mode, wherein the means for generating addresses within the buffer comprises means for generating addresses within contiguous rows or columns of the buffer when the mode of operation comprises the linear mode, and wherein the means for generating addresses within the buffer comprises means for generating addresses within contiguous blocks of the buffer when the mode of operation comprises the block mode.

25. The apparatus of claim 21, further comprising:
means for counting a number of pixels whose pixel values are stored in the buffer;
means for retrieving the pixel values for the pixels that require further processing based on the counted number of pixels; and
means for processing the retrieved pixel values for the pixels that require further processing.

26. The apparatus of claim 21, further comprising:
means for generating scaled versions of the image; and
means for identifying keypoint pixels based on the scaled versions of the image,
wherein the means for determining which pixels require further processing comprises means for determining that the identified keypoint pixels require further processing, and
wherein the means for storing the pixel values for the pixels that require further processing comprises means for storing the pixel values for the identified keypoint pixels in the buffer.

27. The apparatus of claim 21, wherein the pixel values comprise at least one of coordinate values and color values.

28. The apparatus of claim 21, further comprising means for eliminating from further processing pixel values for pixels that do not require further processing.

29. The apparatus of claim 21, further comprising means for not storing pixel value in the buffer that do not require further processing by the GPU.

30. The apparatus of claim 21, wherein the apparatus comprises a wireless communication device.

* * * * *